US010364799B1

United States Patent
Roark et al.

(10) Patent No.: US 10,364,799 B1
(45) Date of Patent: Jul. 30, 2019

(54) SECURE WINDFARM POWER PRODUCTION DURING A SCADA SYSTEM OFFLINE MODE

(71) Applicant: INVENTUS HOLDINGS, LLC, Juno Beach, FL (US)

(72) Inventors: Frank L. Roark, Boca Raton, FL (US); Marc Benedict C. Tinio, Palm Beach Gardens, FL (US); Nicholas A. Wayne, Tequesta, FL (US); Carmine A. Priore, III, Wellington, FL (US); Kevin R. McWhorter, Riviera Beach, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 56 days.

(21) Appl. No.: 15/893,168

(22) Filed: Feb. 9, 2018

(51) Int. Cl.
*F03D 7/04* (2006.01)
*G05B 19/05* (2006.01)
*F03D 7/02* (2006.01)

(52) U.S. Cl.
CPC ............. *F03D 7/048* (2013.01); *F03D 7/028* (2013.01); *G05B 19/05* (2013.01); *F05B 2260/845* (2013.01); *F05B 2270/1033* (2013.01); *F05B 2270/1074* (2013.01); *F05B 2270/504* (2013.01); *G05B 2219/24215* (2013.01); *G05B 2219/2619* (2013.01)

(58) Field of Classification Search
CPC ......... F03D 7/048; F03D 7/028; G05B 19/05; G05B 2219/2619; G05B 2219/24215; F05B 2270/504; F05B 2270/1074; F05B 2260/845; F05B 2270/1033
USPC ....................................................... 700/287
See application file for complete search history.

(56) References Cited

U.S. PATENT DOCUMENTS 8,805,596 B2    8/2014  Ellena et al.
2012/0020786 A1*  1/2012  Ayres ..................... F03D 7/047
                                                      416/1

(Continued)

OTHER PUBLICATIONS

Jacob Aho et al., "Tutorial of Wind Turbine Control for Supporting Grid Frequency through Active Power Control", National Renewable Energy Laboratory, Presented at the American Control Conference, Montreal Canada, Jun. 27-29, 2012.

(Continued)

*Primary Examiner* — Robert E Fennema
*Assistant Examiner* — Jigneshkumar C Patel
(74) *Attorney, Agent, or Firm* — Tarolli, Sundheim, Covell & Tummino LLP

(57) ABSTRACT

A system for generating power includes a supervisory control and data acquisition (SCADA) system that provides control commands to a plurality of turbine controllers to cause a windfarm to output power at a level within power parameters in a setpoint. Each turbine controller is installed at a corresponding wind turbine of a plurality of wind turbines in the windfarm. The system also includes a backup system comprising a programmable logic controller (PLC). The PLC receives turbine state information from the SCADA system that characterizes an operational state of each of the plurality of wind turbines in the windfarm and detects that the SCADA system is offline. The PLC also selectively provides start and stop commands to a plurality of terminal interface units (TIUs) to cause the windfarm to output power at a level within the power parameters identified in the setpoint in response to the detecting.

20 Claims, 4 Drawing Sheets

(56) References Cited

U.S. PATENT DOCUMENTS

2016/0327025 A1 11/2016 Noto
2017/0045869 A1 2/2017 Buenaventura et al.

OTHER PUBLICATIONS

Lucy Y. Pao et al., "A Tutorial on the Dynamics and Control of Wind Turbines and Wind Farms", retrieved from the internet on Jan. 19, 2018.
"Ovation TM, SCADA for Wind Energy Management", Emerson Process Management Power & Water Solutions, retrieved from the internet on Jan. 19, 2018.

* cited by examiner

SECURE WINDFARM POWER PRODUCTION DURING A SCADA SYSTEM OFFLINE MODE

TECHNICAL FIELD

This disclosure relates generally to a backup system that controls a windfarm in response to detecting that a supervisory control and data acquisition (SCADA) system for the windfarm is offline.

BACKGROUND

A windfarm is a group of wind turbines in the same location used to produce electricity. A large windfarm may have several hundred individual wind turbines and cover an extended area of hundreds of square miles, and the land between the turbines may be used for agricultural or other purposes.

In computer science, a heartbeat is a periodic signal generated by hardware or software to indicate normal operation and/or to synchronize other parts of a computer system. Usually a heartbeat is sent between computing systems or software modules at a regular interval in the order of seconds. If the endpoint does not receive a heartbeat for a time (usually a few heartbeat intervals) the computing system or software module that should have sent the heartbeat is assumed to have failed.

A data diode, also referred to as a unidirectional security gateway or unidirectional network, is a network appliance or device that allows data to travel in one direction. Data diodes are found in high security environments and/or industrial control systems, where the data diodes serve as connections between two or more networks of differing security classifications. Data diodes may be used to prevent cyberattacks. A cyberattack is a type of offensive maneuver employed by nation-states, individuals, groups, or organizations that targets computer information systems, infrastructures, computer networks, and/or personal computer devices. Cyberattacks are initiated in a variety of different types of malicious acts usually originating from an anonymous source that either steals, alters, or destroys a specified target by hacking into a susceptible system. Cyberattacks can range from installing spyware on a personal computer to attempts to destroy the infrastructure of entire nations.

SUMMARY

One example relates to a system for generating power that includes a supervisory control and data acquisition (SCADA) system that provides control commands to a plurality of turbine controllers to cause a windfarm to output power at a level within power parameters in a setpoint. Each turbine controller is installed at a corresponding wind turbine of a plurality of wind turbines in the windfarm. The system also includes a backup system comprising a programmable logic controller (PLC). The PLC receives turbine state information from the SCADA system that characterizes an operational state of each of the plurality of wind turbines in the windfarm and detects that the SCADA system is offline. The PLC also selectively provides start and stop commands to a plurality of terminal interface units (TIUs) to cause the windfarm to output power at a level within the power parameters identified in the setpoint in response to the detecting. Each TIU is hard-wired to start and stop buttons for a respective wind turbine of the plurality of wind turbines in the windfarm.

Another example relates to a system for generating power that includes a windfarm having a plurality of wind turbines. Each wind turbine includes a controller that controls operations of the corresponding wind turbine, a start button and a stop button. The system also includes a plurality of TIUs. Each TIU is hard-wired to the start button and the stop button of a respective one of the plurality of wind turbines in the windfarm. The system further includes SCADA system that provides control commands to each turbine controller of the plurality of wind turbines in the windfarm to cause the windfarm to output power at a level within power parameters identified in a setpoint. The system yet further includes a backup system having a programmable logic controller (PLC). The PLC receives turbine state information from the SCADA system that characterizes an operational state of each of the plurality of wind turbines and detects that the SCADA system is offline. The PLC also selectively provides start and stop commands to each of the plurality of TIUs to control the windfarm to output power at a level within the power parameters identified in the setpoint in response to the detecting.

Yet another example relates to a method for controlling a system that generates power that includes detecting, at a backup system, that a supervisory control and data acquisition (SCADA) system that controls a power output level of a plurality of wind turbines in a windfarm is offline. The method also includes maintaining, by the backup system, an operational state of each of the plurality of wind turbines in response to the detecting and retrieving, by the backup system, a present output power level of the windfarm. The method further includes selectively providing, by the backup system, start and stop commands to a plurality of terminal interface units (TIUs) to cause the windfarm to output power at a level within power parameters identified in a setpoint in response to the detection. Each TIU is hard-wired to start and stop buttons for a respective wind turbine of the plurality of wind turbines.

DETAILED DESCRIPTION

Figure 1:
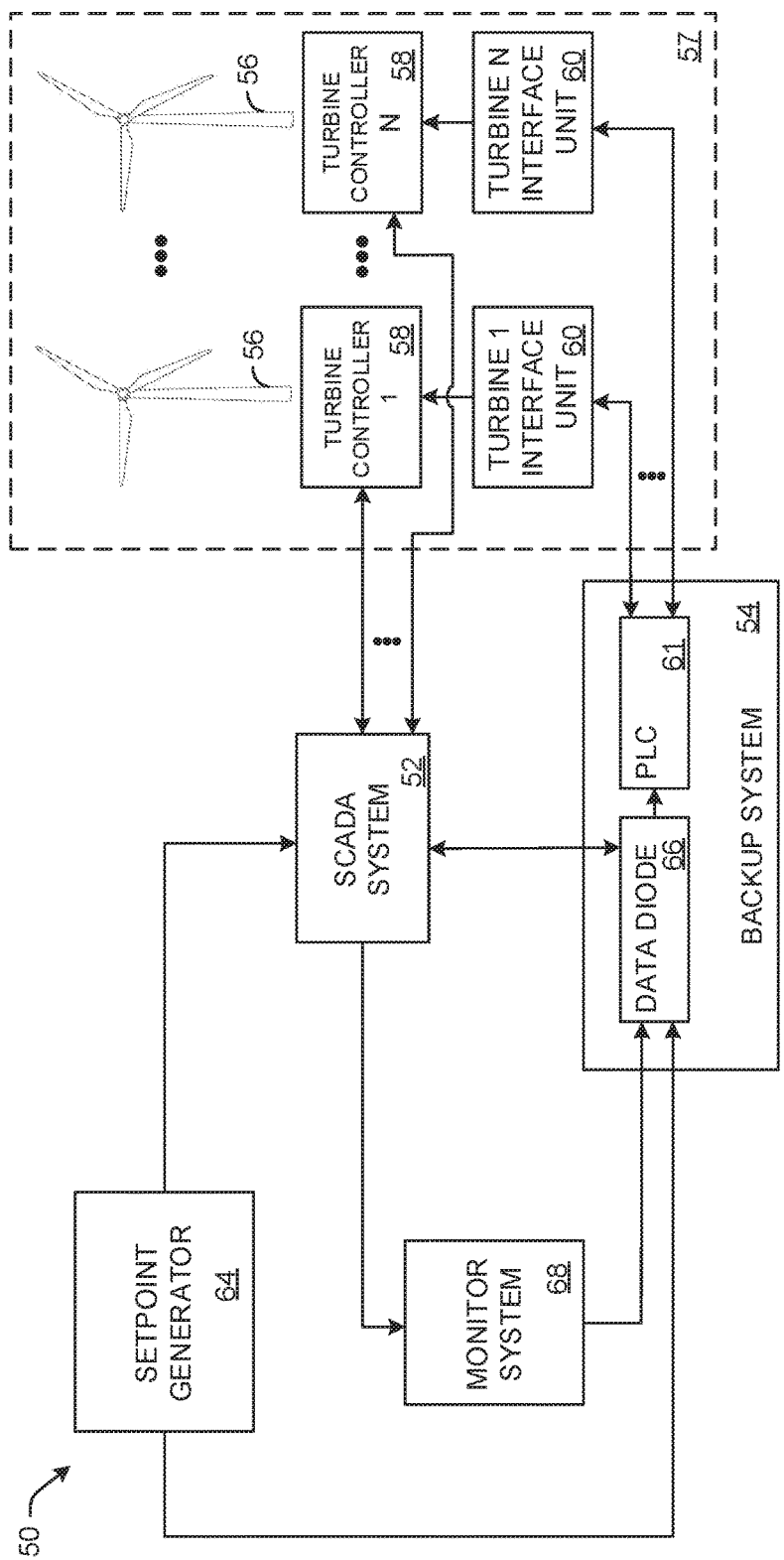
FIG. 1 illustrates an electric generation and supply system that includes a supervisory control and data acquisition (SCADA) system and a backup system.

This disclosure relates to systems and methods for controlling an electric generation and supply system. The system includes a windfarm that has a plurality of wind turbines. Each wind turbine includes a controller that controls operations of the corresponding wind turbine. Each wind turbine has a start button and a stop button connected to the turbine controller. Moreover, each wind turbine has a turbine interface unit (TIU) hard-wired to the stop button and the start button. The system also includes a supervisory control and data (SCADA) system. In a normal mode of operation, the SCADA system provides control commands to each turbine controller of the plurality of wind turbines in the windfarm to cause the windfarm to output power within power parameters identified in a setpoint provided from a setpoint generator.

The system further includes a backup system for the SCADA system. The backup system has a programmable logic controller (PLC) that receives turbine state information from the SCADA system that characterizes an operational state of each of the plurality of wind turbines in the windfarm. In the normal mode of operation, the SCADA system is online (functioning properly). In such a situation, the PLC of the backup system may receive a fault reset commands for faults that are not resettable by the SCADA system. For instance, faults related to safety chains (e.g., over temperature faults) may not be resettable by the SCADA system. Thus, in response to such a fault reset command, the backup system sends a stop command to a TIU associated with a wind turbine identified in the fault reset command. In response, the TIU simulates actuation of the stop button, thereby clearing faults at the wind turbine, including those faults that are not resettable by the SCADA system. In this manner, faults at the plurality of wind turbines of the windfarm can be remotely reset, thereby obviating the need for a technician to visit individual wind turbines and physically depressing the stop button to clear certain faults.

Furthermore, the PLC of the backup system monitors a status of the SCADA system through a heartbeat (a periodic signal generated the SCADA system to indicate normal operation) provided from the SCADA system. If the PLC detects that the heartbeat has stopped, the PLC determines that the SCADA system is offline (e.g., shutdown or otherwise unavailable), and the PLC switches from the normal mode of operation to a backup mode of operation. In response to detecting that the SCADA system is offline, the PLC controls operations of the windfarm to maintain an output level within power parameters identified in the setpoint. In particular, the PLC selectively provides start and stop commands to each of the plurality of TIUs to control the windfarm to output a power level. Thus, the backup system allows the PLC to control the windfarm when the SCADA system is offline.

Additionally, the backup system can include a data diode (a unidirectional network device). Upon detecting that the SCADA system is offline, the PLC can switch the data diode to a security mode. In the security mode, the data diode operates as a protocol aware network device that blocks unauthorized network traffic (packets) addressed to the PLC. Network packets that do not meet a specific set of criteria (e.g., a particular protocol, with a specific set commands and a password) are dropped or otherwise discarded. Accordingly, in the security mode, the data diode prevents unauthorized access to the PLC of the backup system.

By employment of the electric generation and supply system, in the normal mode of operation, faults that are not resettable by the SCADA system can be reset by the PLC of the backup system operating in concert with the TIUs. Moreover, the backup system is configured such that if the SCADA system goes offline (intentionally or unintentionally), the PLC can continue to operate the windfarm to output power commensurate with the power parameters identified in the setpoint. Accordingly, the need to shut down the windfarm due to the SCADA going offline is avoided.

FIG. 1 illustrates an electric generation and supply system 50 that includes a SCADA (supervisory control and data acquisition) system 52 and a backup system 54. The SCADA system 52 can be implemented as a computing device, such as one or more servers that execute application software on top of an operating system. That is, the SCADA system 52 may be implemented as a combination of hardware and software. The SCADA system 52 is configured to send control commands to N number of wind turbines 56 that form a windfarm 57, where N is an integer greater than or equal to two (2). The windfarm 57 is coupled to a power grid, and an output power level of the windfarm 57 may be monitored by a substation meter (not shown). In this manner, the N number of wind turbines 56 generate power that is provided to the power grid. The system 50 is designed such that in the event of a failure of the SCADA system 52, the backup system 54 provides backup control commands the N number of wind turbines 56.

Each of the N number of wind turbines 56 includes a turbine controller 58. Each turbine controller 58 controls the operation of the corresponding wind turbine 56. In particular, each turbine controller 58 turns the corresponding wind turbine 56 on and off in response to a request from the SCADA system 52. Further, each turbine controller 58 can control advanced operations of the wind turbines, such as blade pitch, cut-in speed, cut-out speed, rotor speed, etc. Additionally, each turbine controller 58 can provide data to the SCADA system 52 that identifies (among other things) an operational state (e.g., on, off, rotor speed, blade pitch, power output, etc.) of the corresponding wind turbine 56 and faults at the corresponding wind turbine 56. Each turbine controller 58 could be implemented, for example, as a programmable logic controller (PLC). The SCADA system 52 can provide commands to each of the N number of turbine controllers 58 to reset a fault experienced by the corresponding wind turbine 56. In response, the turbine controller 58 resets a fault at the corresponding wind turbine 56.

It is noted that some of the faults in the turbine controller 58 are not resettable by the SCADA system 52. Accordingly, each wind turbine 56 includes a turbine interface unit (TIU) 60 that is hard-wired to a start button and a stop button installed at each wind turbine 56. Each such start and stop button serves as a manual input for the turbine controller 58. Each TIU 60 is communicatively coupled to a programmable logic controller (PLC) 61 of the backup system 54. The PLC 61 can provide a start command and a stop command to each TIU 60. In response to a start command from the PLC 61 of the backup system 54, the TIU 60 actuates a relay (e.g., closes a normally opened relay) hard-wired to nodes (terminals) of the start button of the wind turbine 56, which is referred to as a start relay. Similarly, in response to a stop command from the PLC 61 of the backup system 54, the TIU 60 actuates a relay (e.g., opens a normally closed relay) hard-wired to nodes (terminals) of the stop button, which is referred to as a stop relay. Actuating the stop relay clears faults on the corresponding wind turbine 56, including the faults that are not resettable by the SCADA system 52. In this manner, the backup system 54 allows remote starting, stopping and resetting of faults for the N number of wind turbines 56. Such remote stopping and starting obviates the need for a technician to travel to individual wind turbines 56 in the windfarm 56 to depress the stop button.

Additionally, the system 50 includes a setpoint generator 64 that provides a setpoint to the SCADA system 52 and to the PLC 61 of the backup system 54. The setpoint generator 64 may be representative of a network server that communicates with the SCADA system 52 via a network (e.g., the Internet or a private network). The setpoint generator 64 may be operated, for example, by a consumer and/or reseller (e.g., an "off-taker") of power output by the windfarm 57 (e.g., at a customer premises). That is, in some examples, the setpoint generator 64 is a remote system. In other examples, the setpoint generator 64 is a locally operated system. The setpoint provided by the setpoint generator 64 defines power parameters (output power generation limits) for the windfarm 57. In particular, the setpoint provided from the setpoint generator 64 provides a requested minimum amount of power and a maximum amount of power to be generated by the N number of wind turbines 56 in the windfarm 57. That is, the setpoint sets generation limits for the overall power generation by the windfarm 57.

In some examples, the backup system 54 receives the setpoint at a data diode 66 or similar network device. The data diode 66 controls the flow of data packets to the PLC 61 of the backup system 54. Similarly, the data diode 66 controls the flow of data between the PLC 61 of the backup system 54 and external network comments such as the SCADA system 52. In other examples, the data diode 66 may be omitted. In a normal mode of operations (e.g., the SCADA system 52 is online) the data-diode acts as a pass-through of data packets.

The SCADA system 52 analyzes the set point and an output state of the N number of wind turbines 56 to generate control commands for the N number of turbine controllers 58 to achieve the output characterized in the setpoint. The SCADA system 52 can control the operational parameters of the N number of wind turbines 56, such as a cut-in speed, a cut-out speed, a blade pitch, rotor speed, etc. Additionally, the SCADA system 52 can selectively start and stop sets of the N number of wind turbines in the windfarm 57. As a simplified example, if the setpoint sets a maximum power output for the windfarm 57 to a level of about one-half of a present power output by the windfarm 57, the SCADA system 52 may send a turn-off command to turbine controllers 58 for some (e.g., half) of the N number of wind turbine 56. Additionally or alternatively, the SCADA system 52 may send a command to change a blade pitch to some turbine controllers 58 to reduce a power output (e.g., change blade pitch) for some of the wind turbines 56.

Furthermore, the SCADA system 52 can provide the turbine state information for each of the N number of wind turbines 56 to a monitor system 68. The monitor system 68 could be representative of a computer system (e.g., a server) operating at a site remote to the windfarm 57 or could be operating locally (e.g., at the site of the windfarm 57). The monitor system 68 can analyze the turbine state information to determine when and if a fault reset command is to be generated. In such a situation, the monitor system 68 identifies a class (category) of the fault to determine if the fault is resettable by the SCADA system 52. For example, the monitor system 68 may identify a fault related to excessive vibration (e.g., due to high winds) of a given wind turbine 56 of the windfarm 57. In such a situation, the monitor system 68 can classify the fault as being resettable by the SCADA system 52. Moreover, the monitor system 68 may generate a fault reset command for the given wind turbine 56 upon detection that the vibration of the given wind turbine is reduced.

In such a situation, the monitor system 68 provides the fault reset command to the SCADA system 52. The fault reset command is sent as a network message addressed to the SCADA system 52. In some examples, the data diode 66 of the backup system 54 (or similar network device) receives the fault reset command. The data diode 66 controls the flow of data to the PLC 61 of the backup system 54. In the example where the fault reset command is provided to the data diode 66 of the backup system 54, the fault reset command is routed to the SCADA system 52. Moreover, it is understood that in some examples, the data diode 66 may be omitted, and the monitor system 68 may be able to communicate directly with the SCADA system 52.

In response to the fault reset command, the SCADA system 52 provides a corresponding fault reset command to the turbine controller 58 associated with the given wind turbine 56. In response, the turbine controller 58 associated with the given wind turbine 56 resets the fault, and the state of the given wind turbine 56 is updated accordingly.

Additionally, as noted, some faults cannot be reset by the SCADA system 52. For example, faults that are categorized as being in a class of safety-chain faults are not resettable by the SCADA system 52. For instance, a fault related to a temperature exceeding a threshold level may be a safety chain fault that is not resettable by the SCADA system 52. As one example, if the monitor system 68 detects that the given wind turbine 56 has a fault classified as a safety chain fault, the monitor system 68 generates a fault reset command that addressed to the PLC 61 of the backup system 54. In response to the fault reset command, the PLC 61 provides a stop command to a TIU 60 associated with the given wind turbine 56. In response to receipt of the stop command, the TIU 60 actuates the stop relay connected to the stop button of the turbine controller 58 of the given wind turbine 56, thus simulating depressing of the stop button and clearing faults present at the given wind turbine 56.

The SCADA system 52 intermittently and/or periodically (e.g., in a range of about every 5 seconds to about every 10 minutes) provides the turbine state information for the N number of wind turbines 56 in the windfarm 57 to the PLC 61 of the backup system 54 and to the monitor system 68. Furthermore, the SCADA system 52 provides a heartbeat to the PLC 61 of the backup system 54 indicate that the SCADA system 52 is operating properly. Additionally, as noted, the PLC 61 receives the setpoint provided from the setpoint generator 64 that is updated periodically and/or asynchronously.

The SCADA system 52 may go into an offline mode for a plurality of reasons. For instance, a hardware or software malfunction at the SCADA system 52 may shutdown the SCADA system 52 unintentionally. As noted, the SCADA system 52 may be implemented as an operating system based server. In such a situation, updates to the operating system may force an occasional rebooting. Furthermore, the SCADA system 52 may be accessed by an unauthorized user (e.g., a hacker) or software program (e.g., a computer virus) that disables operations of the SCADA system 52. In any of these situations (or other situations), the SCADA system 52 is considered to be offline. Upon the SCADA system 52 going offline, the SCADA system 52 ceases the heartbeat to the PLC 61 of the backup system 54.

The PLC 61 of the backup system 54 is configured to detect the stoppage of the heartbeat (e.g., for about 1-10 heartbeat cycles) from the SCADA system 52 and switch to a backup mode of operation from the normal mode of operation. In the backup mode of operation, the PLC 61 evaluates the state of each of the N number of wind turbines 56 and initially maintains each of the N number of wind turbines 56 in the same state as their state at the time the SCADA system 52 went offline, which is referred to as an initial state. That is, wind turbines 56 that were on at the time the SCADA system 52 went offline are initially kept on, and wind turbines 56 that were turned off at the time the SCADA system 52 are initially kept turned off.

Additionally, the PLC 61 of the backup system 54 evaluates the setpoint and the turbine state information to control operation of the windfarm 57. Additionally, the PLC 61 queries the substation power meter to determine a present power output by the windfarm 67. Based on this information, the PLC 61 of the backup system 54 selectively provides start and stop commands to the TIUs 60 of the N number of wind turbines 56 in the windfarm 57 to achieve the power generation output a level identified in the setpoint. For instance, if the setpoint indicates that the windfarm 57 is generating about one-half of the desired amount of power identified in the setpoint, the PLC 61 may send a start command to TIUs 60 associated with some (or all) of the wind turbines 56 that are turned off. Further, the PLC 56 evaluates the turbine state information to avoid inadvertently activating a malfunctioning wind turbine 56. Additionally, in a simplified example where the setpoint indicates that the windfarm 57 is generating twice the maximum allowed power, and all of the N number of wind turbines 56 are turned on, the PLC 61 can send a stop command to the TIUs 60 associated with half of the wind turbines 56 in the windfarm 57. In this manner, the backup system 54 can turn wind turbines 56 on or off to meet the power generation levels identified in the setpoint, which can change over time.

Additionally, upon detecting that the SCADA system 52 is offline, the PLC 61 activates a security mode of the data diode 66 of the backup system 54. Upon activation of the security mode, the data diode 66 prevents most network traffic (packets) from flowing to the PLC 61 of the backup system 54. In particular, the data diode 66 prevents data flowing to the PLC 61 except for data related to the setpoint, reset commands from the monitor system 68 and/or the heartbeat from the SCADA system 52. Additionally, the data diode 66, operating in the security mode allows request from the PLC 61 to responses to the requests to pass through. Accordingly, the PLC 61 can query external systems (e.g., the substation meter) for power values. By blocking other data, an unauthorized user or software of the SCADA system 52 (e.g., a hacker) is prevented from controlling and/or changing the configuration of the PLC 61. In this manner, the data diode 66 provides protection from cyberattacks.

Furthermore, as noted the monitor system 68 also receives the turbine state information from SCADA system 52. If the SCADA system 52 fails to provide updates to the turbine state information for a predetermined amount of time (e.g., 2-10 minutes), the monitor system 68 determines that the SCADA system 52 is offline. Upon detecting that the SCADA system 52 is offline, the monitor system 68 addresses fault reset commands to the PLC 61 of the backup system (instead of the SCADA system 52). As noted, in response to a reset command for a specific wind turbine 56, the PLC 61 provides a stop command to the TIU 60 associated with the specific wind turbine 56. In response, the TIU 60 actuates the stop relay (hard-wired to the stop button) of the specific wind turbine 56, clearing faults at the specific wind turbine.

In backup mode, the backup system 54 maintains operation of the windfarm 57, and continues to allow the setpoint to be changed (e.g., by the setpoint generator 64). That is, the PLC 61 can continue to change operations of the N number of wind turbines 56 based on the updated setpoint in time periods where the SCADA system 52 is offline. Moreover, as noted, the backup system 54 (via the data diode 66) provides protection against cyberattacks to the SCADA system 52.

Upon restoration of the heartbeat by the SCADA system 52, the PLC detects that the SCADA system 52 is online, and switches back to the normal mode and deactivates the security mode of the data diode 66. Similarly, the monitor system 68 also detects an update to the turbine state information for the windfarm 57 and switches back to the normal mode.

By employment of the electric generation and supply system 50, the windfarm 57 continues to operate and produce power within the power parameters set forth in the setpoint without interruption upon the SCADA system 52 going offline. This avoids the need to shutdown operation of the windfarm 57 during a time period that the SCADA system is in an offline mode. Furthermore, in the normal mode (situations where the SCADA system 52 is online), the backup system 54 operating in concert with the TIUs 60 can clear faults that are not resettable by the SCADA system 52. In this manner, in the normal mode or the backup mode, the full set of faults that may be incurred by the wind turbines 56 of the windfarm 57 are remotely resettable. Thus, the electric generation and supply system 50 curtails shutdown time for the windfarm 57, and reduces (or eliminates) the need for technicians to physically visit individual wind turbines 56 to depress the stop button to clear faults.

Figure 2:
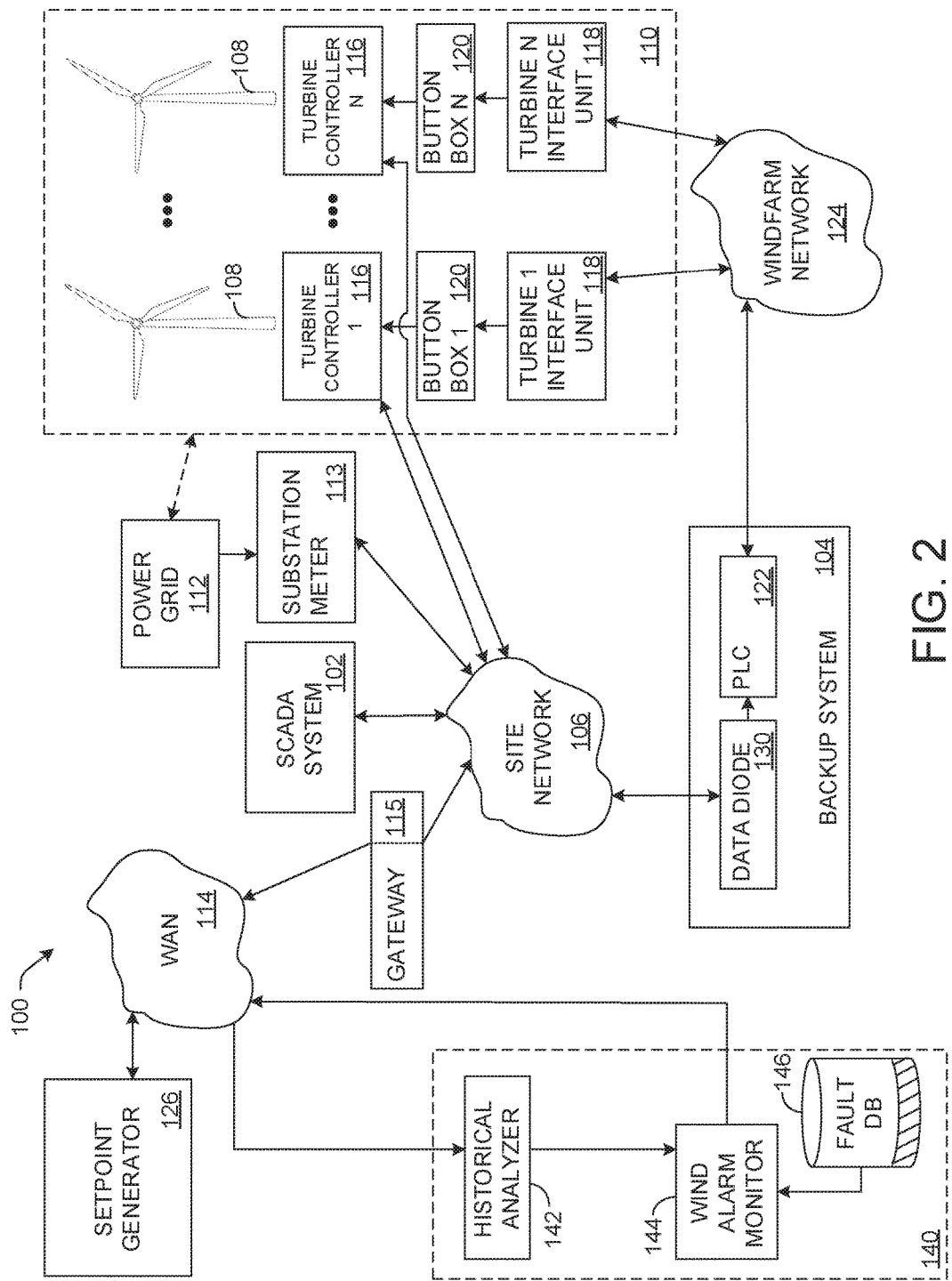
FIG. 2 illustrates another example of an electric generation and supply system that includes a SCADA system and a backup system.

FIG. 2 illustrates another example of an electric generation and supply system 100 that includes a SCADA system 102 and a backup system 104. The SCADA system 102 and the backup system 104 are coupled to a site network 106 and are configured to send control commands to N number of wind turbines 108 that form a windfarm 110, where N is an integer greater than or equal to two (2). The windfarm 110 is coupled to a power grid 112. In this manner, the N number of wind turbines 108 generate power that is provided to the power grid 112. For purposes of simplification of explanation, details of the power grid 112 (e.g., substations, transmission lines, etc.) are omitted. The system 100 is designed such that in the event of a failure or other action that causes the SCADA system 102 go offline (shut down or otherwise unavailable), the backup system 104 provides backup control commands the N number of wind turbines 108. In particular, the system 100 has two modes of operation, namely a normal mode of operation where the SCADA system 102 is online (functioning properly) and a backup mode wherein the SCADA system 102 is offline (shut down or otherwise unavailable).

A substation meter 113 (e.g., a computing system) can monitor power output by the windfarm 110 that is provided to the power grid 112. The substation meter 113 can provide data characterizing a present power output of the windfarm 110 to the backup system 104 or other system, as explained herein.

The site network 106 can be implemented as a local area network (LAN) that is coupled to a wide area network (WAN) 114. The WAN 114 could be representative of a public network (e.g., the Internet), a private network or a combination thereof (e.g., a virtual private network). Moreover, a gateway 115 and/or other network device can be logically positioned between the site network 106 and the WAN 114 to filter and/or route network traffic from nodes coupled to the WAN 114 to nodes coupled to the site network 106.

Each of the N number of wind turbines 108 includes a turbine controller 116 that is coupled to the site network 106. Each turbine controller 116 controls the operation of the corresponding wind turbine 108. In particular, each turbine controller 116 turns the corresponding wind turbine 108 on and off in response to a commands from the SCADA system 102. Additionally, each turbine controller 116 controls other operations of the wind turbines 108, such as cut-in/cut-out speed, rotor speed, blade pitch etc., in response to commands from the SCADA system 102. Each turbine controller 116 can provide data to the SCADA system 102 that identifies (among other things) an operational state (e.g., on, off, rotor speed, blade pitch, power output, etc.) of the corresponding wind turbine 108 and faults at the corresponding wind turbine 108. The collective operational state of the windfarm 110 (the operational state for each of the N number of wind turbines 108) is referred to as turbine state information. Each turbine controller 116 could be implemented, for example, as a programmable logic controller (PLC). Each turbine controller 116 is also connected to the site network 106.

In the normal mode of operation, the SCADA system 102 can provide commands to each of the N number of turbine controllers 116 to reset a fault experienced by the corresponding wind turbine 108. In response, the turbine controller 116 resets a fault at the corresponding wind turbine 108.

It is noted that some of the faults in the turbine controller 116 are not resettable by the SCADA system 102. Accordingly, each wind turbine 108 includes a TIU (turbine interface unit) 118 that is hard-wired to a start button and a stop button installed in a button box 120 at each wind turbine 108. Each button box 120 is coupled to the corresponding turbine controller 116 for the wind turbine 108. Each TIU 118 is communicatively coupled to a PLC 122 of the backup system 54. The PLC 122 can be implemented as an industrial computer device with software and hardware employed to execute specific instructions. The PLC 122 can provide a start command and a stop command to each TIU 118.

Figure 3:
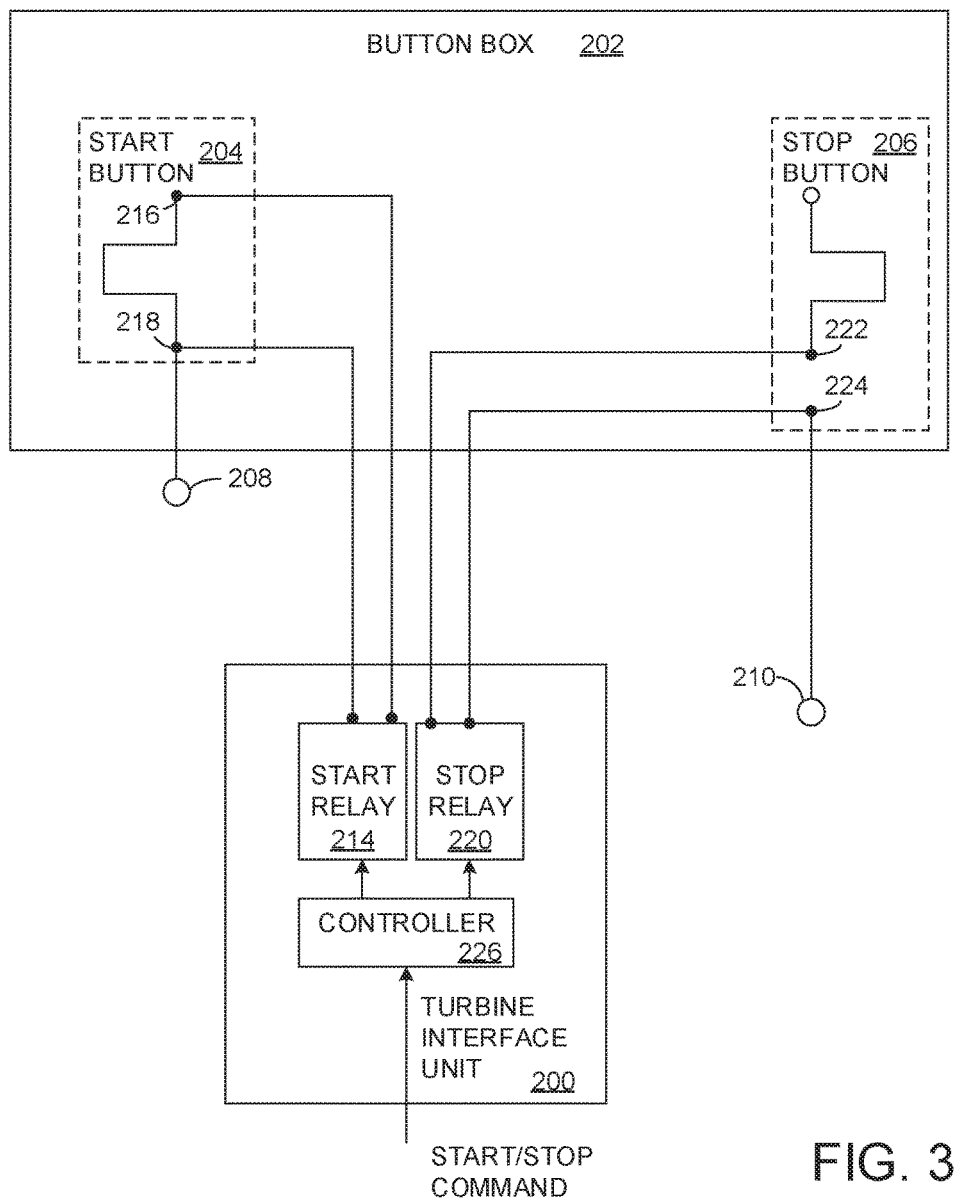
FIG. 3 illustrates an example of a terminal interface unit (TIU) for a wind turbine.

FIG. 3 illustrates a diagram of an example of a TIU 200 that is coupled to a button box 202 of a wind turbine. The TIU 200 could be employed to implement one of the N number of TIUs 118 of FIG. 1, and the button box 202 could be employed to implement a corresponding button box 120.

The button box 202 can be implemented as a user control panel with a (physical) start button 204 and a (physical) stop button 206. In at least one example, the start button 204 and the stop button 206 can be hard-wired to a corresponding turbine controller (not shown) at terminals 208 and 210, respectively. Moreover, the corresponding turbine controller could be implemented as one of the turbine controllers 116 of FIG. 2. In at least one example, the start button 204 is a normally open button and the stop button 206 is a normally closed button.

The TIU 200 includes a start relay 214 coupled to a first node 216 and a second node 218 of the start button 204. The start relay 214 is a normally open relay. Actuation of the start relay 214 shorts the first node 216 and the second node 218 of the start button 204, simulating a physical pressing of the start button 204. The TIU 200 also includes a stop relay 220 coupled to a first node 222 and a second node 224 of the stop button 206. The stop relay 220 is a normally closed relay. Actuation of the stop relay 220 opens connection between the first node 222 and the second node 224 of the stop button 206, simulating a physical pressing of the stop button 206.

The TIU 200 also include a controller 226 (e.g., a microcontroller) that controls the actuation of the start relay 214 and the stop relay 220. In particular, the controller 226 receives start and stop commands (e.g., network messages) from an external system, such as the PLC 122 of FIG. 2. In response to a start command, the controller 226 actuates the start relay 214. Similarly, in response to a stop command, the controller 226 actuates the stop relay 220.

Referring back to FIG. 2, each TIU 118 communicates with the PLC 122 via a windfarm network 124 (a device network). The windfarm network 124 can be implemented as a private network. In some examples, the windfarm network 124 represents a segment of the site network 106 with a separate networking address space. Additionally or alternatively, the windfarm network 124 could be implemented as a separate network from the site network 106.

As explained with respect to FIG. 3, in response to a start command from the PLC 122 of the backup system 104, the TIU 118 actuates a start relay hard-wired to the start button in the button box 120 of the corresponding wind turbine 108, thereby simulating a physical pressing of the start button. Similarly, in response to a stop command from the PLC 122 of the backup system 104, the TIU 118 actuates a stop relay hard-wired to the stop button of the button box 120 of the corresponding wind turbine 108. Actuating the stop relay simulates a physical pressing of the stop button and clears faults on the corresponding wind turbine 108, including the faults that are not resettable by the SCADA system 102. In this manner, the backup system 104 allows remote, starting, stopping and resetting of faults for the N number of wind turbines 108 in the windfarm 110.

Additionally, the system 100 includes a setpoint generator 126 coupled to the WAN 114. The setpoint generator 126 provides a setpoint to the SCADA system 102 and to the PLC 122 of the backup system 104 via the WAN 114 and the site network 106. The setpoint generator 126 may be representative of a remote network server, such as a cloud server that is controlled by a consumer or reseller (e.g., an "off-taker") of power generated by the windfarm 110. Alternatively, the setpoint generator 126 could be implemented as a local system coupled to the site network 106. The setpoint provided by the setpoint generator 126 defines power parameters (power output generation limits) for the windfarm 110. In particular, the setpoint provided from the setpoint generator 126 provides a requested minimum amount of power and a maximum amount of power to be generated by the N number of wind turbines 108 in the windfarm 110. That is, the setpoint sets power generation limits for the overall power generation by the windfarm 110. The setpoint can be provided to the SCADA system 102 and the backup system 104 via the WAN 114 and the site network 106.

As noted, the backup system 104 receives the setpoint generated by the setpoint generator 126. In some examples, the backup system 104 receives the setpoint at a data diode 130 or similar network device. The data-diode 130 controls the flow of data packets to the PLC 122 of the backup system 104. Accordingly, the data diode 130 controls the flow of data between the PLC 122 backup system 104 and the SCADA system 102. In other examples, the data-diode 130 may be omitted. In normal mode of operation (e.g., the SCADA is online) the data-diode acts a pass-through of data packets.

In the normal mode of operation, the SCADA system 102 analyzes the set point and an operational state of the N number of wind turbines 56 to generate control commands for the N number of turbine controllers 58 to achieve the power output level within the power parameters characterized in the setpoint. The SCADA system 102 can control the operational parameters of the N number of wind turbines 108, such a cut-in speed, a cut-out speed, a blade pitch, etc. Additionally, the SCADA system 102 can selectively start and stop sets of the N number of wind turbines in the windfarm 110. As a simplified example, if the setpoint sets a maximum power output for the windfarm 110 to a level of about one-half of a present power output by the windfarm 110, the SCADA system 102 may send a turn-off command to turbine controllers 116 for some (e.g., half) of the N number of wind turbine 108. Additionally or alternatively, the SCADA system 102 may send a command to change a blade pitch to some turbine controllers 116 to reduce a power output (e.g., change blade pitch) for some of the wind turbines 108. In response to such commands, the turbine controllers 116 control the corresponding wind turbines 108.

Furthermore, in the normal mode of operation, the SCADA system 102 can provide the turbine state information that characterizes the operational state for each of the N number of wind turbines 108 to a monitor system 140 via the site network 106 and the WAN 114. The monitor system 140 could be representative of a computer system (e.g., a server) or multiple computer systems (e.g., a cloud computing system) with application software operating at a remote control system. Alternatively, the monitor system 140 could be representative of a computing system operating on the site network 106.

The monitor system 140 includes an historical analyzer 142 that monitors the turbine state information for the N number of wind turbines 108 in the windfarm 110 for a prediction of power output based on past and current performance of the wind turbines 108. Additionally, the monitor system 140 includes a wind alarm monitor 144 that identifies resettable faults in the windfarm 110. In particular, the wind alarm monitor 144 identifies when and if a fault on a given wind turbine 108 should be reset.

In response to detecting a fault at the given wind turbine 108, the wind alarm monitor queries a fault database 146 (or other data structure) to determine the classification of the fault, and the conditions for resetting the fault. For instance, if the fault is related to high winds, the fault database 146 may identify a maximum wind speed. In such a situation, the wind alarm monitor 144 generates the reset command upon determining that the wind speed for the windfarm 110 is below the maximum wind speed.

In the normal mode of operation, upon determining that a fault is to be reset, the wind alarm monitor also determines whether the fault is resettable by the SCADA system 102. For example, the monitor system 140 may identify a fault related to excessive vibration (e.g., due to high winds) of a given wind turbine 108 of the windfarm 110. In such a situation, the monitor system 140 can classify the fault as being resettable by the SCADA system 102. If the fault is resettable by the SCADA system 102, the wind alarm monitor 144 generates a reset command for the given wind turbine that is addressed to the SCADA system 102.

In response to the fault reset command, the SCADA system 102 provides a corresponding fault reset command to the turbine controller 116 associated with the given wind turbine 108. In response, the turbine controller 116 associated with the given wind turbine 108 resets the fault, and the operational state of the given wind turbine 108 (provided to the SCADA system 102) is updated accordingly.

Additionally, as noted, some faults cannot be reset by the SCADA system 102. For example, faults that are categorized as being in a class of safety-chain faults my not be resettable by the SCADA system 102. For instance, a fault related to a temperature exceeding a threshold level may be a safety chain fault that is not resettable by the SCADA system 102. As one example, if the wind alarm monitor 144 detects that the given wind turbine 108 has a fault classified as a safety chain fault, the wind alarm monitor 144 generates a fault reset command that addressed to the PLC 122 of the backup system 104.

The reset command addressed to the PLC 122 of the backup system 104 is received at the data diode 130, which passes the reset command to the PLC 122. Moreover, it is understood that in some examples, the data diode 130 may be omitted. In response to the fault reset command, the PLC 122 of the backup system 104 provides a stop command to a TIU 118 associated with the given wind turbine 108. In response to receipt of the stop command, the TIU 118 actuates the stop relay connected to the stop button in the button box 120 of the turbine controller 116 of the given wind turbine 56, thereby clearing faults present at the given wind turbine 108.

In the normal mode of operation, the SCADA system 102 intermittently and/or periodically (e.g., in a range of about every 5 seconds to about every 10 minutes) provides the turbine state information characterizing the operational state for the N number of wind turbines 108 in the windfarm 110 to the PLC 122 of the backup system 104 via the data diode 130. Furthermore, the SCADA system 102 provides a heartbeat to the PLC 122 via the data diode 130 to indicate that the SCADA system 102 is operating properly. Additionally, as noted, the PLC 122 of the backup system 104 also receives the setpoint from the setpoint generator 126 that is updated periodically and/or asynchronously.

The SCADA system 102 may go offline for a plurality of reasons. For instance, a hardware or software malfunction at the SCADA system 102 may shutdown the SCADA system 102 unintentionally. Additionally, the SCADA system 102 may be implemented as an operating system based server. In such a situation, updates to the operating system may force an occasional rebooting. Furthermore, the SCADA system 102 may be accessed by an unauthorized user (e.g., a hacker) or software program (e.g., a computer virus) during a cyberattack that disables operations of the SCADA system 102. In any of these situations (or other situations), the SCADA system 102 is considered to be offline. Upon the SCADA system 102 going offline, the SCADA system 102 ceases the heartbeat to the PLC 122 of the backup system 104.

The backup system 104 is configured to detect the stoppage of the heartbeat (e.g., for about 1-10 heartbeat cycles) from the SCADA system 102 and switch to the backup mode of operation from the normal mode of operation. In the backup mode of operation, the PLC 122 evaluates the state of each of the N number of wind turbines 108 and initially maintains each of the N number of wind turbines 108 in the same state as their state at the time the SCADA system 102 went offline. That is, initially, wind turbines 108 that were on at the time the SCADA system 102 went offline are initially kept on, and wind turbines 108 that were turned off at the time the SCADA system 102 are initially kept turned off.

Additionally, upon detecting that the SCADA system 102 is offline, the PLC 122 activates a security mode of the data diode 130 of the backup system 104. In some examples, the data diode 130 is implemented as a protocol aware Modbus data diode that monitors network traffic flowing to the PLC 122.

Upon activation of the security mode, the data diode 130 prevents most network traffic (packets) from flowing to the PLC 122 of the backup system 104. In the security mode, the data diode 130 analyzes incoming network packets and allows only those packets meeting certain criteria to pass through to the PLC 122. In particular, the data diode 66 prevents data flowing to the PLC 61 except for data related to the setpoint, reset commands from the monitor system 68 and/or the heartbeat from the SCADA system 52. Additionally, the data diode 66, operating in the security mode allows a request from the PLC 122 and responses to the requests to pass through. Accordingly, the PLC 122 can query external systems, such as the substation meter 113 for output power levels of the windfarm 110.

For instance, network messages with an update to the setpoint include a Modbus Write command (in a specific protocol) to a particular set of addresses in the PLC 122 and a password (or other authentication technique) indicating that the updated setpoint is valid. The data diode 130 can be configured to allow the messages meeting this criteria to pass through to the PLC 122, but other messages (which may be unauthorized messages) are blocked/dropped. By blocking/dropping other data, an unauthorized user of the SCADA system 102 (e.g., a hacker) and/or unauthorized software (e.g., a virus) is prevented from controlling and/or changing the configuration of the PLC 122. In this manner, the data diode 130 provides protection from cyberattacks.

Additionally, in the backup mode of operation, the PLC 122 queries the substation meter 113 for a present (e.g., within about the last 10 minutes or less) power output level of the windfarm 110. Further, the PLC 122 evaluates the setpoint and the turbine state information to control operation of the windfarm 110. In particular, the PLC 122 selectively provides start and stop commands to the TIUs 118 of the N number of wind turbines 108 in the windfarm 110 to achieve the power generation output identified in the setpoint. For instance, if the setpoint and the present power output level indicates that the windfarm 110 is generating about one-half of the desired amount of power identified in the setpoint, the PLC 122 of the backup system 104 may send a start command to TIUs 118 associated with some (or all) of the wind turbines 108 that are turned off. Additionally, in a simplified example, the present power output level and the setpoint indicates that the windfarm 57 is generating twice the maximum allowed power and all of the N number of wind turbines 56 are turned on. In this situation, the PLC 122 can send a stop command to the TIUs 118 associated with half of the wind turbines 108 in the windfarm 110. In this manner, the PLC 122 of the backup system 104 can turn the wind turbines 108 on or off to meet the power generation levels identified in the setpoint, which can change over time.

Furthermore, as noted the historical analyzer 142 receives the turbine state information from the SCADA system 102. If the turbine state information is not updated for a predetermined amount of time (e.g., 1-20 minutes), the historical analyzer 142 determines that the SCADA system 102 is offline, and the monitor system 140 switches from the normal mode of operation to the backup mode of operation. In response to detecting that the SCADA system 102 is offline, the monitor system 140 provides a notification to the wind alarm monitor 144. In response, the wind alarm monitor 144 addresses fault resets to the PLC 122 of the backup system (instead of the SCADA system 102). As noted, in response to a reset command for a specific wind turbine 108, the PLC 122 provides a stop command to the TIU 118 associated with the specific wind turbine 108. In response, the TIU 60 actuates the stop relay of the specific wind turbine 108, thereby clearing faults at the specific wind turbine 108.

In the backup mode of operation, the backup system 104 maintains operation of the windfarm 110, and continues to allow the setpoint to be changed (e.g., by the setpoint generator 126) during time periods that the SCADA system 102 is offline. Moreover, as noted, the backup system 104 (via the data diode 130) provides protection against cyberattacks to the SCADA system 102 and/or other network devices.

Upon restoration of the heartbeat by the SCADA system 102, the PLC 122 detects that the SCADA system 102 is online, and switches back to the normal mode and deactivates the security mode of the data diode 130. Similarly, the monitor system 68 also detects that the turbine state information for the N number of wind turbines 108 is updated and switches back to the normal mode.

By employment of the electric generation and supply system 100, the windfarm 110 continues to operate within the power parameters set forth in the setpoint without interruption upon the SCADA system 102 going offline. Accordingly, the backup system 104 curtails downtime of the windfarm 110. Furthermore, in situations where the SCADA system 102 is online, the backup system 104 operating in cooperation with the TIUs 118 can clear faults that are not resettable by the SCADA system 102. In this manner, in the normal mode or the backup mode, the full set of faults that may be incurred by the N number of wind turbines 108 in the windfarm 110 are remotely resettable. Thus, the need for technicians to physically visit and depress the stop button of wind turbines 108 to clear faults is avoided.

Figure 4:
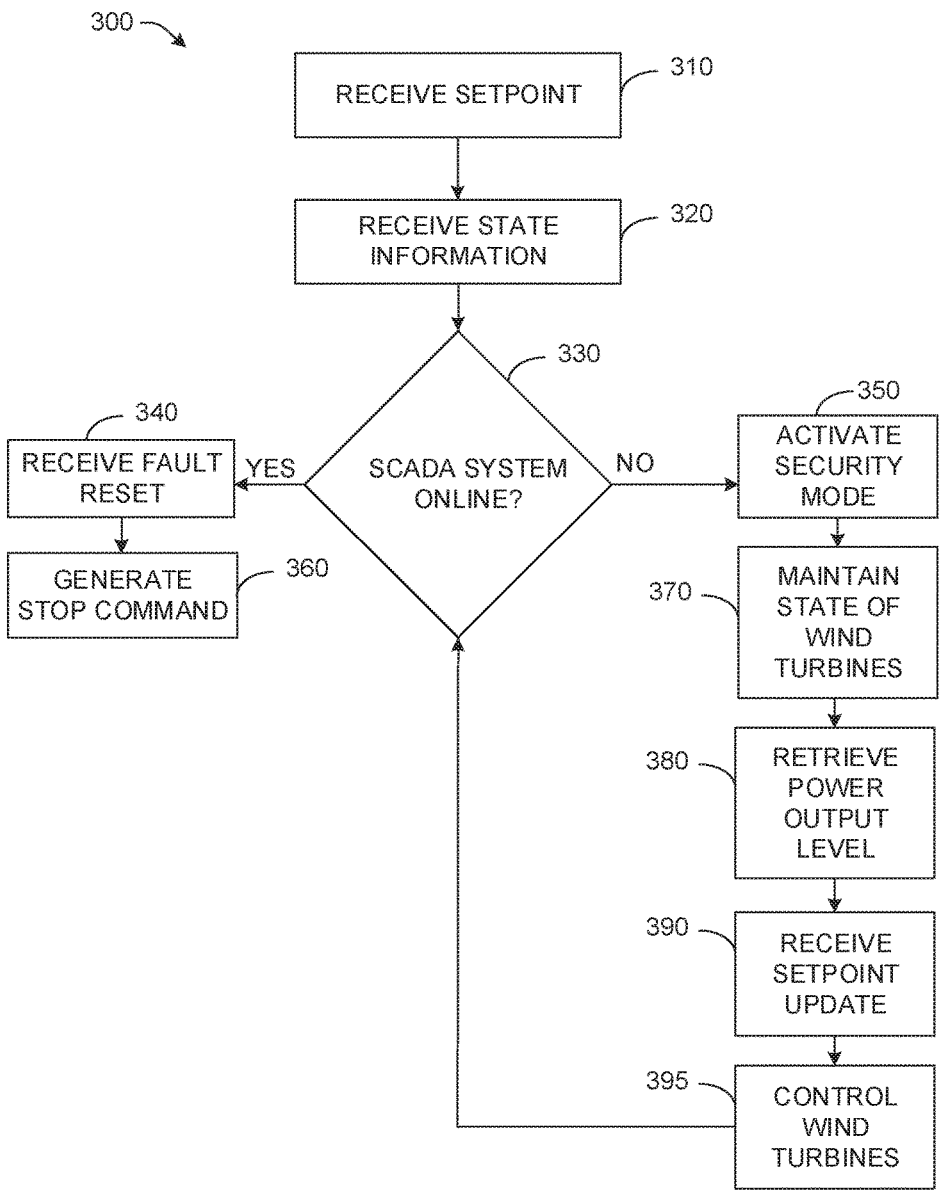
FIG. 4 illustrates a flowchart of an example method for operating a backup system for an electric generation and supply system that includes a SCADA system.

In view of the foregoing structural and functional features described above, an example method will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 4 illustrates a flow diagram of an example method 300 for operating a backup system on an electric generation and supply system with a SCADA, such as the electric generation and supply system 50 of FIG. 1 and/or the electric generation and supply system 100 of FIG. 2. The method 300 could be implemented with a backup system, such as the backup system 54 of FIG. 1 and/or the backup system 104 of FIG. 2.

At 310, a PLC (e.g., the PLC 122 of FIG. 2) of the backup system receives a setpoint generated by a setpoint generator 126. The setpoint identifies power parameters (power output limits) for a windfarm (e.g., the windfarm 110 of FIG. 2). At 320, the PLC receives turbine state information from the SCADA system (e.g., the SCADA system 102 of FIG. 2).

At 330, the PLC makes a determination as to whether the SCADA system is online. The determination at 330 can be based, for example, on detection the presence or absence of a heartbeat from the SCADA system. If the determination at 330 is positive (e.g., YES), the method 300 proceeds to 340. If the determination at 330 is negative (e.g., NO), the method 300 proceeds to 350.

At 340, the PLC receives a fault reset command from a node of a monitor system (e.g., the monitor system 140 of FIG. 2). The fault reset command identifies a particular wind turbine in the windfarm that is to be reset. At 360, the PLC generates a stop that is sent command to a TIU (e.g., the TIU 118 of FIG. 1) associated with the specific wind turbine. The stop command causes the TIU to actuate a stop relay hard-wired to a stop button connected to the specific wind turbine, thereby clearing the fault.

At 350, (switching to a backup mode of operation) the PLC activates a security mode of a data diode (e.g., the data diode 130 of FIG. 2) connected to the PLC. In the security mode, the data diode restricts network traffic to the PLC, in the manner described herein. At 370, the PLC maintains the initial state of the wind turbines of the windfarm at the time the SCADA system went offline. The initial state is identified in the turbine state information. At 380, the PLC retrieves a present power output level of the windfarm from a substation meter. Additionally, at 390, the PLC receives an update to the setpoint. At 395, the PLC controls the wind turbines to cause the windfarm to output power at a level within power parameters specified in the setpoint. The controlling includes selecting providing a start or stop command to TIUs of wind turbines to increase or decrease the power output by the windfarm. The method returns to 330.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for generating power comprising:
    a supervisory control and data acquisition (SCADA) system that provides control commands to a plurality of turbine controllers to cause a windfarm to output power at a level within power parameters in a setpoint, wherein each turbine controller is installed at a corresponding wind turbine of a plurality of wind turbines in the windfarm;
    a backup system comprising a programmable logic controller (PLC) that:
        receives turbine state information from the SCADA system that characterizes an operational state of each of the plurality of wind turbines in the windfarm;
        detects that the SCADA system is offline; and
        selectively provides start and stop commands to a plurality of terminal interface units (TIUs) to cause the windfarm to output power at a level within the power parameters identified in the setpoint in response to the detecting, wherein each TIU is hard-wired to start and stop buttons for a respective wind turbine of the plurality of wind turbines in the windfarm.

2. The system of claim 1, wherein the setpoint is provided to the SCADA system and the PLC of the backup system from a setpoint generator in network messages.

3. The system of claim 1, wherein the PLC receives a fault reset command from a monitor system, wherein the fault reset command identifies a given wind turbine of the plurality of wind turbines, and the PLC provides a stop command to the TIU for the given wind turbine in response to the fault reset command.

4. The system of claim 1, wherein the backup system further comprises a data diode that limits network traffic to the PLC of the backup system in a security mode.

5. The system of claim 4, wherein the data diode drops network packets addressed to the PLC that do not meet a predefined criteria.

6. A system for generating power comprising:
    a windfarm comprising a plurality of wind turbines, wherein each wind turbine comprises:
        a controller that controls operations of a corresponding wind turbine;
        a start button; and
        a stop button;
    a plurality of terminal interface units (TIUs), wherein each TIU is hard-wired to the start button and the stop button of a respective one of the plurality of wind turbines in the windfarm;
    a supervisory control and data acquisition (SCADA) system that provides control commands to each turbine controller of the plurality of wind turbines in the windfarm to cause the windfarm to output power at a level within power parameters identified in a setpoint;
    a backup system comprising a programmable logic controller (PLC) that:
        receives turbine state information from the SCADA system that characterizes an operational state of each of the plurality of wind turbines;
        detects that the SCADA system is offline; and
        selectively provides start and stop commands to each of the plurality of TIUs to control the windfarm to output power at a level within the power parameters identified in the setpoint in response to the detecting.

7. The system of claim 6, wherein the SCADA system and the PLC are nodes of a first network, and the PLC and each of the TIUs are nodes of a second network, wherein the second network has a different address space than the first network.

8. The system of claim 6, wherein the backup system further comprises a data diode that limits network traffic to the PLC of the backup system in a security mode.

9. The system of claim 8, wherein the data diode discards network packets addressed to the PLC that do not meet a predefined criteria.

10. The system of claim 8, wherein the PLC activates the security mode on the data diode in response to detecting that the SCADA system is offline.

11. The system of claim 6, wherein the PLC receives a fault reset command from a monitor system, wherein the fault reset command identifies a given wind turbine of the plurality of wind turbines, and the PLC provides a stop command to a TIU for the given wind turbine in response to the fault reset command.

12. The system of claim 11, wherein the monitor system provides the fault reset command to the PLC in response to determining that a fault at the given wind turbine is not resettable by the SCADA system.

13. The system of claim 11, wherein the monitor system provides the fault reset command to the PLC in response to determining that the SCADA system is offline.

14. The system of claim 6, wherein the PLC receives an update to the setpoint in a time period wherein the SCADA system is offline and the PLC selectively provides the start and stop commands to each of the plurality of TIUs to control the windfarm to output a power level within power parameters identified in the updated setpoint.

15. The system of claim 6, wherein the PLC queries a substation monitor for a present power output level of the windfarm to facilitate the selective providing of the start and stop commands.

16. The system of claim 6, wherein each TIU comprises:
    a normally open relay coupled to two nodes of the start button of a respective wind turbine of the plurality of wind turbines, and the TIU closes the normally open relay in response to the start command from the PLC; and a normally closed relay coupled to two nodes of the stop button of the respective wind turbine, and the TIU opens the normally closed relay in response to the stop command from the PLC.

17. The system of claim 6, wherein opening of the normally closed relay of each TIU clears faults present at the corresponding wind turbine of the plurality of wind turbines.

18. A method for controlling a system for generating power comprising:
- detecting, by a backup system, that a supervisory control and data acquisition (SCADA) system that controls a power output level of a plurality of wind turbines in a windfarm is offline, wherein the backup system comprising a programmable logic controller (PLC);
- maintaining, by the backup system, an operational state of each of the plurality of wind turbines in response to the detecting;
- retrieving, by the backup system, a present output power level for the wind turbine; and
- selectively providing, by the backup system, start and stop commands to a plurality of terminal interface units (TIUs) to cause the windfarm to output power at a level within power parameters identified in a setpoint in response to the detecting, wherein each TIU is hard-wired to start and stop buttons for a respective wind turbine of the plurality of wind turbines.

19. The method of claim 18, further comprising activating a security mode of a data diode of the backup system in response to the detecting, wherein the data diode restricts network traffic to the PLC in the security mode.

20. The method of claim 18, further comprising:
- receiving, at the backup system, a fault reset command for a given wind turbine of the plurality of wind turbines; and
- providing, by the backup system, a stop command to a given TIU of the plurality of TIUs that is associated with the given wind turbine of the plurality of wind turbines in response to the fault reset command.

* * * * *